United States Patent

[11] 3,612,766

[72] Inventor Billy G. Ferguson
8129 Luree Lane, Hermitage, Tenn. 37076

[21] Appl. No. 19,796
[22] Filed Mar. 16, 1970
[45] Patented Oct. 12, 1971

[54] TELEPHONE-ACTUATING APPARATUS FOR INVALID
13 Claims, 6 Drawing Figs.

[52] U.S. Cl. .......... 179/1 HF, 179/81 R
[51] Int. Cl. .......... H04m 1/00
[50] Field of Search .......... 179/1 HF, 1 HS, 81 R, 81 B

[56] References Cited

UNITED STATES PATENTS 3,109,893 11/1963 Burns .......... 179/1 HF
3,170,990 2/1965 Beatty .......... 179/1 HF
3,248,481 4/1966 Grote et al. .......... 179/1 HF

*Primary Examiner*—Kathleen Claffy
*Assistant Examiner*—William A. Helvestine
*Attorney*—Harrington A. Lackey

ABSTRACT: A telephone-actuating apparatus adapted to be controlled solely by the voice of a person, and particularly an invalid, including an electrical control circuit connected to the receiving and transmitting circuits of an existing telephone and adapted to actuate the telephone receiver contact switch element and the dialing mechanism. The control circuit includes gating, relay and timing elements, adapted to close the receiver contact switch element by a voice signal during an initial period and to open the switch element by another voice signal during a subsequent termination period. The control circuit also permits actuation of the dialing mechanism by another voice signal after the termination of the initial period and prior to the commencement of the termination period.

INVENTOR:
BILLY G. FERGUSON
BY
Harrington A. Lackey
ATTORNEY

INVENTOR:
BILLY G. FERGUSON
BY Harrington A. Lackey
ATTORNEY

INVENTOR:
BILLY G. FERGUSON
BY
Harrington A. Lackey
ATTORNEY

TELEPHONE-ACTUATING APPARATUS FOR INVALID

BACKGROUND OF The INVENTION

This invention relates to a telephone actuating apparatus, and more particularly to a telephone actuating apparatus permitting a person to answer, talk over, "hang up," and dial a telephone solely by voice signal controls.

There are numerous telephone-actuating devices which automatically lift a telephone receiver, or elevate the telephone receiver button, and actuate the dialing mechanism, automatically in electrical and electronically controlled alarm systems, which are energized by sensing devices adapted to detect intruder, fires and other abnormal conditions. These actuating devices include solenoids connected to the handsets, or handset buttons, for raising and lowering them. These devices also include solenoids adapted, when energized, to move dialing device, such as discs, into engagement with the existing dial on the telephone, and are also provided with dial motors for actuating the dialing devices to rotate the telephone dial.

However, to the best of applicant's knowledge, there are no prior control circuits for actuating the telephone receiver switch and dialing mechanism solely by voice control, much less by the sequence of voice signals required for an effective telephone control apparatus which can be operated satisfactorily by an invalid who is completely paralyzed in his limbs, but still has complete control of his speech and hearing faculties.

SUMMARY OF THE INVENTION

The telephone actuating apparatus made in accordance with this invention includes an electronically controlled circuit adapted to be "turned on" or energized by an initial voice signal of predetermined quality or amplitude. The energization of the control circuit immediately turns on the existing telephone circuit by closing the receiver contact switch element, such as by elevating the handset button. The energization of the control circuit also energizes two timer elements which establish sequentially, an initial period, a dialing period and a termination period. A second voice signal emitted during the dialing period will energize the control circuit to actuate the dialing mechanism to dial "O" or the operator, so that the invalid can give the operator the telephone number he desires. A voice signal emitted during the termination period will deenergize the control circuit to effectively "hangup" the telephone.

The above control system may be incorporated in a chassis upon which the base of an existing telephone may be received. The handset of the telephone is removed from the telephone and placed in a special support on the chassis which provides communication of the receiver and transmitter of the handset with the receiving and transmitting circuits of the control system. An especially adapted handset button depressor is fitted on the cradle of the telephone and operatively connected to a solenoid within the control circuit. The dial of the telephone is located in proximity to a mechanical dialing mechanism in the chassis. Appropriate circuits in the chassis are connected to a loudspeaker for transmitting the incoming voice messages to the invalid, and a microphone is adapted to be located adjacent to the invalid's mouth for more effective transmission of his voice into the telephone.

BRIEF DESCRIPTION OF THE DRAWINGS

FIG. 3 is a fragmentary rear sectional elevational of a portion of the chassis disclosing the handset button actuating mechanism, with the button depressing lever shown in phantom in operative position;

DESCRIPTION OF THE PREFERRED EMBODIMENT

Figure 5:
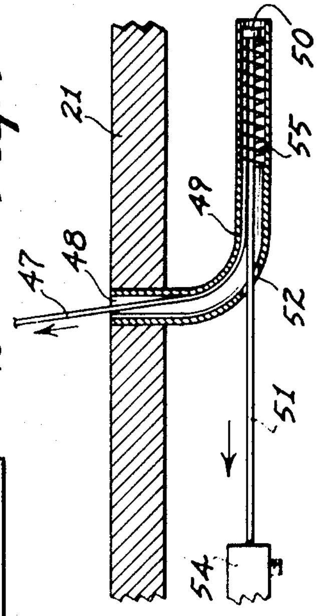
FIG. 5 is another enlarged fragmentary sectional elevational disclosing another element in the handset button actuating mechanism.

Referring now to the drawings in more detail, the apparatus 10 is disclosed as adapted for actuating a french-type telephone including a base 11, a rotary dial 12, a receiver 13 having an earpiece 14 and a mouthpiece 15, and a cradle 16. The cradle 16 is provided with buttons 17 normally depressed by the handset 13, when seated in the cradle 16, to open the switch element not shown, in the telephone circuit, not shown. When the buttons 17 are raised, the switch element closes the telephone circuit.

The apparatus 10 includes a chassis 20 having a platform 21 for supporting the telephone base 11, which in turn is received between the retaining elements 22, 23 and 24, of any desired construction.

Figure 1:
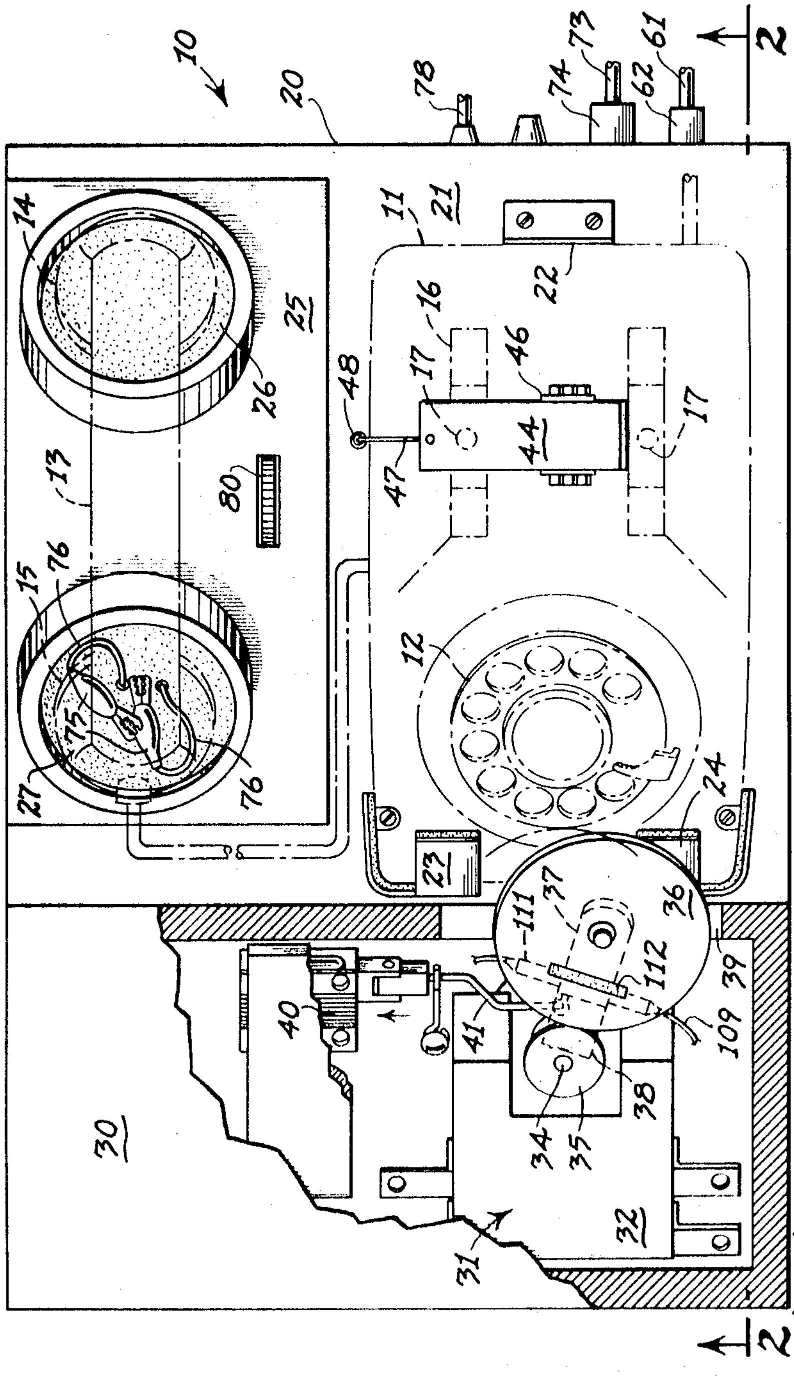
FIG. 1 is a top plan view of the chassis, with parts broken away to disclose the dialing mechanism, of the apparatus made in accordance with this invention, and showing the location of the telephone handset in operative positions on the chassis.
Figure 2:
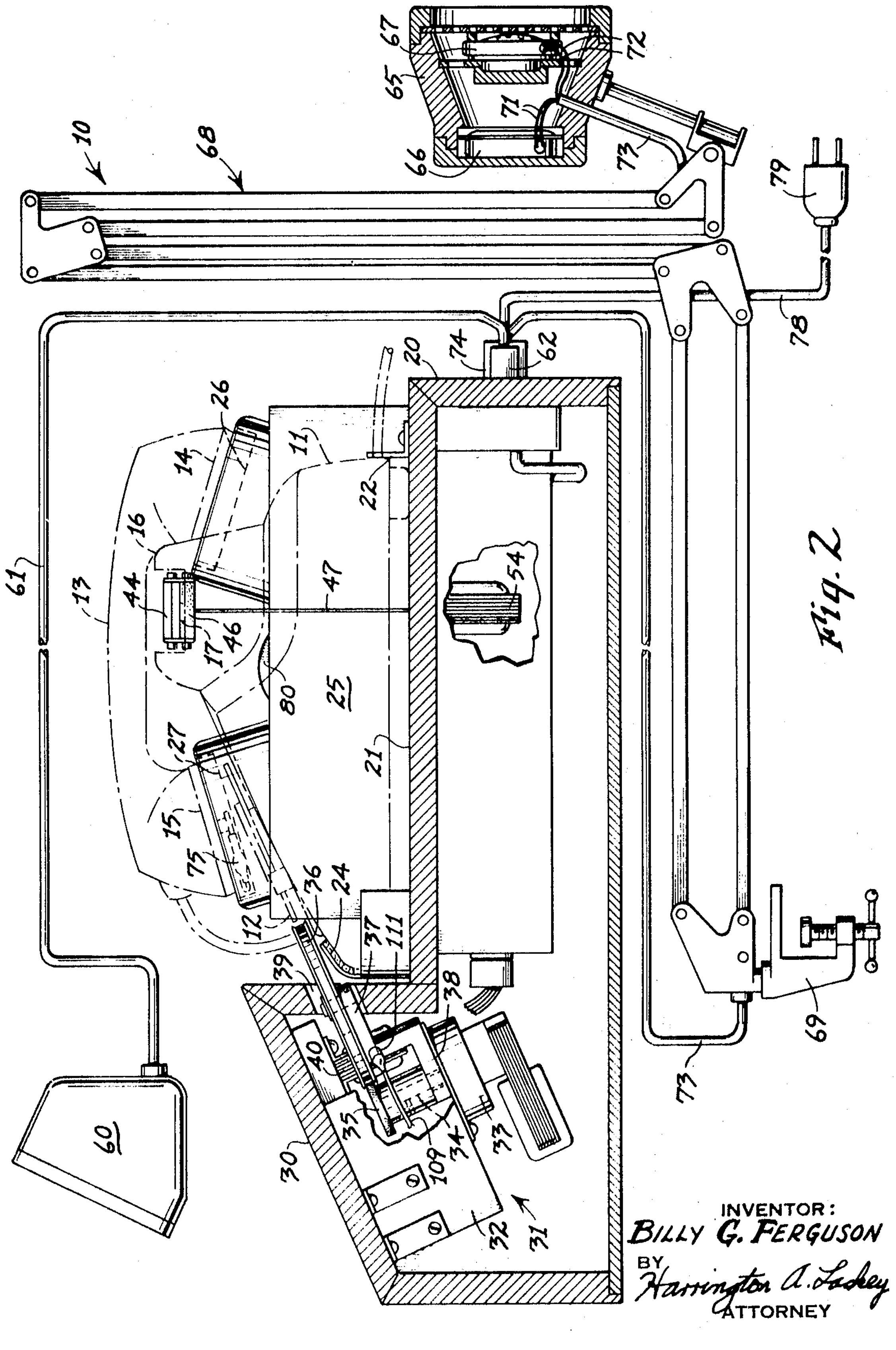
FIG. 2 is a section taken along the line 2—2 of FIG. 1, and further disclosing the loudspeaker, and boom microphone assembly, with the microphone housing shown in section, and with parts of the chassis broken away.

The chassis 20 also includes to the left of the platform 21 (upper portion of FIG. 1), a handset mount 25 provided with an earpiece recess 26 for receiving the earpiece 14 of the handset 13, and a mouthpiece recess 27 for receiving the mouthpiece 15.

The front portion of the chassis 20 comprises an upwardly and rearwardly inclined housing 30 for receiving the dial mechanism 31.

The dialing mechanism 31 includes a bracket 32 fixed to the chassis 20 which supports the dial motor 33. The dial motor 33 drives through the motor shaft 34 a drive wheel 35. The periphery of the drive wheel 35 is in constant driving engagement with the periphery of a dialing disc 36 rotatably supported upon the radially extending arm 37 of a bracket 38 pivotally mounted upon the motor shaft 34. The dialing disc 36 is mounted to project through a slot 39 in the housing 30 so that the disc 36 can be moved toward and away from frictional engagement with the telephone dial 12.

Also fixed within the housing 30 is the dial solenoid 40 having its armature operatively connected to the bracket 38 through the link rod 41. The connection of the link rod 41 is such that when the solenoid 40 is energized, the dialing disc 36 is pulled into frictional driving engagement with the periphery of the dial 12. When the solenoid 40 is deenergized, the dialing disc 36 is moved away from engagement with the dialing disc 12 by means of a spring, not shown, or by a spring within the solenoid 40 which urges its armature to protracted position.

The device for normally maintaining the switch element for the telephone circuit open, by depressing one of the handset buttons 17, includes a depressing lever 44 pivotally mounted by pivot pin 45 on a supporting bracket 46. Bracket 44 is of the proper length and is provided with yieldable end portions, for being tightly wedged between the opposing yoke posts of the cradle 16. The free end of the lever 44 is connected to one end of a flexible linear member 47, such as a cord, cable, wire or monofilament, which extends, preferably down the left side of telephone base 11, through an opening 48 in the chassis 20 and through a curved guide tube 49, where the opposite end of the linear member 47 terminates in a plug or disc 50, as best disclosed in FIG. 5. The plug 50 forms the extremity of a rigid rod 51 projecting through an opening 52 in the tube wall 49. The opposite end of the rod 51 is connected to the armature of the button solenoid 54. As best disclosed in FIG. 5, one end of a spring 55 coiled around the rod 51 is fixed to the interior of the tube wall 49 and the other end of spring 55 is biased against the plug 50. Consequently, the rod 51 and linear member 47 are urged toward the right of FIG. 5, when the solenoid 54 is deenergized, to pull the lever 44 down in its solid-line inoperative position of FIG. 3, to depress the handset button 17. When the solenoid 54 is energized to pull the rod 51 in the direction of the arrow, that is to the left of FIG. 3, the plug 50 compresses the spring 55 and permits the spring 56 (FIG. 4) seated in the bracket 46 to urge the lever 54 up, thereby releasing the switch button 17 to turn on the telephone circuit, not shown.

The apparatus 10 also includes a loudspeaker 60 electrically connected by an electrical conduit 61 and plug 62 to an amplifier circuit 64 (FIG. 6) within the chassis 20, which in turn is connected to an inductive pickup coil 63 (FIG. 6) located in the earpiece recess 26 adjacent the telephone earpiece 14 for picking up, amplifying and broadcasting the incoming voice message.

The apparatus 10 also includes a microphone housing 65 containing a control microphone housing 65 is mounted on one extremity of a collapsible and extensible microphone boom 68. The opposite end of the boom 68 is adapted to be mounted in a clamp bracket 69, adapted for attachment to the edge of a table. The microphones 66 and 67 are connected by their leads 71 and 72, respectively, to cable 73, which in turn extends through the hollow linkage of the boom 68 and is connected by plug 74 into an outlet in the chassis 20.

Preferably, the voice transmitting microphone 67 is the existing voice transmitting microphone within the telephone mouthpiece 15. When the apparatus 10 is set up for operation, the covers of the mouthpiece 15 and microphone housing 65 are removed, and the telephone microphone 67 is removed and inserted into the housing 65. The microphone leads in the mouthpiece 15 are then electrically connected to the alligator clips 75 of the leads 76 which project from the mouthpiece recess 27. The leads 76 are then connected to appropriate circuitry, not shown, and ultimately connected through the plug 74 and cable 73 to the leads 72 and transmitter microphone 67. This construction permits the telephone or transmitting microphones 67 to be placed adjacent to the speaker with a minimum of distortion in the transmitted voice message.

Power is supplied to all of the circuitry through power cord 78 and plug 79 adapted to be connected to any convenient source of electrical energy, such as a wall receptacle, not shown.

The incoming voice volume received through the loudspeaker 60 may be adjusted by rotating the adjustment wheel 80, if desired.

Figures 4, 6, 7:
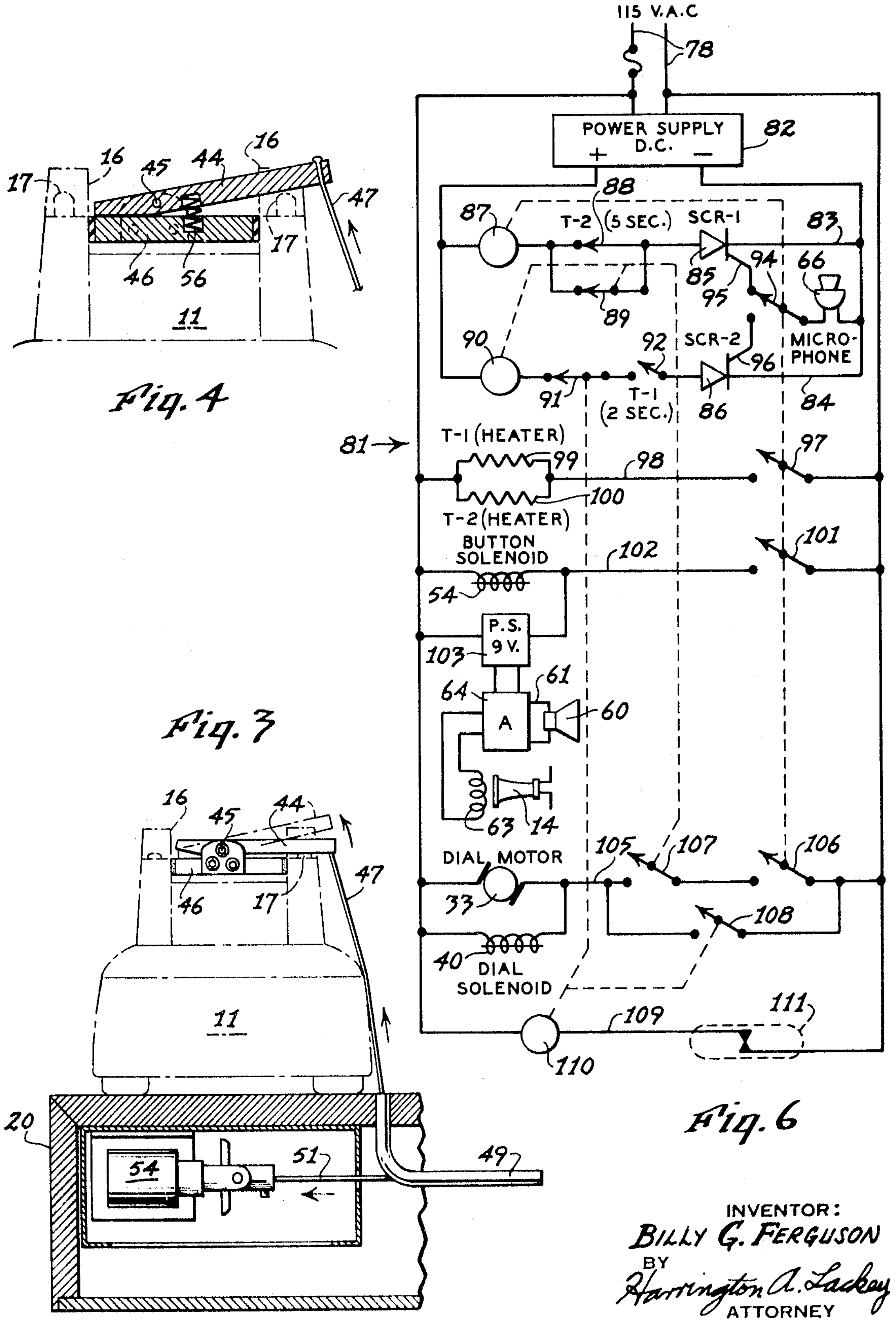
FIG. 4 is an enlarged fragmentary sectional elevation showing the button depressing lever in operative position.
FIG. 6 is a diagram of the control circuit made in accordance with this invention, showing all switches in their initial inoperative positions, with stabilizing capacitors, rectifiers and other necessary elements for more efficient performance of the circuit, but which form no part of this invention, omitted.

With reference to the diagram of the control circuit 81 of FIG. 6, the power supply leads 78 are connected to a DC power supply circuit 82, where the high-voltage AC current is rectified and stepped down to a low DC voltage. The circuit 82 supplies a low DC voltage to a first gating circuit 83 and a second gating circuit 84 connected in parallel , each gating circuit including an electronic gating device, such as the solid-state SCR's 85 and 86, respectively.

In addition to the SCR 85, the first gating circuit 83 includes in series a first relay coil 87 and a terminal timer switch (T–2) 88 in series. Connected in parallel with the terminal timer switch 88 is a shunt relay switch 89.

The second gating circuit 84 includes, in series with the second SCR 86, a second relay coil 90, a relay switch 91 and a dialing timer switch (T–1) 92.

Control microphones 66 generates its own power when actuated by sound. Control microphone 66 is connected to selector switch 94, which is a relay switch of the first relay coil 87, adapted to be shifted between contact with the signal or bias lead 95 of the first SCR 85 when the coil 87 is deenergized, and contact with the signal or bias lead 96 of the second SCR 86 when the coil 87 is energized.

The first relay coil 87 also controls relay switch 97 in the heater circuit 98, including in parallel the dialing heater element (T–1) 99 and the terminal heater element (T–2) 100. The dialing heater element 99, when energized by the closing of the relay switch 97, is adapted to close the dialing switch 92 in the second gating circuit 84 after a predetermined determined time, for example, 2 seconds. In a similar manner, the terminal heater element 100, when energized by the closing of the same relay switch 97, is adapted to phone the terminal timer switch 88 after a predetermined period of time longer than the time for closing the switch 92, for example, 5 second.

First relay coil 87 also controls relay switch 101 in circuit 102, which includes in parallel the button solenoid 54 and the power supply circuit 103 for the amplifier 64 of the loudspeaker 60. Thus, when switch 101 is closed, the button solenoid 54 and the loudspeaker amplifier power supply circuit 103 are energized simultaneously.

The dialing circuit 105 includes in parallel the dial motor 33 and the dial solenoid 40. The dialing circuit 105 includes dial relay switches 106 and 107 connected in series, and each switch 106 and 107 is controlled by its respective relay coil 87 and 90. Dial relay switches 106 and 107 are connected in parallel with another relay switch 108.

The relay coil 90 in the second gate circuit 84 controls the shunt relay switch 89 and the dial relay switch 107. Thus, when relay coil 90 is energized , the shunt switch 89 will be opened and the dial relay switch 107 will close.

Limit switch circuit 109 includes a third relay coil 110 is series with a limit switch in the form of a magnetic reed switch 111. Physically, the reed switch 111 is mounted snugly in a corresponding recess in the lateral arm 37 adjacent to a bar magnet 112 fitted in a corresponding recess in the lower portion of the dialing disc 36. The reed switch 111 is so positioned that it will remain closed by virtue of its proximity to the bar magnet 112 when the dialing disc 36 is in its inoperative position. When the dialing disc 36 is rotated the bar magnet 112 will rotate away from, and therefore open, the reed switch 111.

The third relay coil 110 in the limit switch circuit 109 controls the relay switch 91 in the second gating circuit 84 and also the dial relay switch 108 in the circuit 105. Thus when the reed switch 111 is open, the relay coil 110 will become deenergized to automatically open switch 91 and close dialing switch 108.

To operate the apparatus 10 made in accordance with this invention, and particularly where it is to be used by a bedridden invalid, the chassis 20 is placed on top of a bedside table or stand. The base 11 of the telephone is seated upon the platform 21 and held in position by the retaining members 22, 23 and 24. The handset 13 is removed from the cradle 16 and placed upon the mount 25 so that the earpiece 14 is seated in the recess 26 and the mouthpiece 15 is seated in the recess 27. The button depressing lever bracket 46 is then snugly fitted in the cradle 16, as disclosed in the drawings, with the lever 44 extending over one of the switch buttons 17. With the button solenoid 54 deenergized, the lever 44 will automatically depress the switch button 17.

When the telephone base 11 is properly seated on the platform 21, the dial 12 will be adjacent to but disengaged from the dialing disc 36.

The loudspeaker 60 is positioned in any convenient location in the vicinity of the invalid where the invalid can clearly hear the incoming message transmitted by the loudspeaker 60 when the volume wheel 80 is properly adjusted.

The boom bracket 69 is fastened to a tabletop or any other convenient stationary structure so that the boom 68 can be extended to position the microphone housing 65 in the vicinity of the invalid's mouth so that the voice messages of the invalid may be received and effectively transmitted by the transmitting microphone 67, and the voice signals, such as whistles, of the invalid, can be received and effectively energized the control microphone 66, which is preferably a crystal microphone.

As previously mentioned, the transmitting microphone 67 may be the transmitting microphone in the mouthpiece 15 of the telephone handset 13. By removing the cover of mouthpiece 15, the transmitting microphone 67 may be disconnected from the mouthpiece and the cover of the microphone housing 65 removed so that the transmitting microphone 67 may be inserted into the housing 65. After the transmitting microphone 67 is connected to the lead wires 72, the housing 65 is closed. The microphone leads in the mouthpiece 15 are then connected to the alligator clips 75, and the transmitting microphone 67 is then electrically connected from the housing 65 through the cable 73 and ultimately to the wires in the mouthpiece 15 to which it was originally connected. In this manner, no distortion noise or other unnecessary interference is transmitted in the voice message of the invalid to the telephone mouthpiece 15.

The electrical conduits 61 and 73 are connected by their respective plugs 62 and 74 into receptacles to corresponding circuitry in the chassis 20, and the power supply plug 79 is inserted into a 110-or 115-volt AC wall receptacle.

In the event that the telephone rings, indicating an incoming call, the invalid may actuate the telephone circuit by emitting a whistle or other noise of sufficient volume or amplitude to energize the control microphone 66 in the microphone bracket 65. Since the initial position of the selector switch 94 is in contact with the bias lead 95 of the first SCR 85, as disclosed in FIG. 6, the voice control signal from the microphone 66 will energize the first SCR 85 to "turn on" the first gate circuit 83, thereby energizing the first relay coil 87. Energization of the first relay coil 87 will immediately disconnect the selector switch 94 from the bias lead 95 and connect the control microphones 66 to the bias lead 96 of the second SCR 86. Moreover, energization of the first relay coil 87 actuates relay switches 97, 101*m* and 106 to simultaneously close the heater circuit 98 and button solenoid circuit 102. However, closing of the dial relay switch 106 will not energize the dialing circuit 105 since, at this time the dial relay switch 107 remains open.

The closed switch 101 energized the button solenoid 54 to release the tension in the flexible linear member to permit spring 56 to raise the button depressing lever 44 and permit the switch buttons 17 to rise, thereby closing the switch in the telephone circuit, and permit the incoming call to transmit over the loudspeaker 60. The energized circuit 102 also energized the power supply 103 to the loudspeaker amplifier 64 to amplify the incoming voice message from the earpiece 14 to the loudspeaker 60.

The closing of the relay switch 97 also energizes both timer heater elements 99 and 100.

After approximately 2 seconds, or the time required for heater element 99 to actuate and thereby close the switch 92, the second gate circuit 84 is then completely closed, to arm or condition the second SCR 86 for energization by another voice signal received in the control microphone 66. However, since the call is an incoming call, an d no dialing is required, a voice signal at this time would not be appropriate.

Approximately 5 seconds after the first voice signal, or any other prescribed time for the heater element 100, the heater element 100 will actuate the terminal timer switch 88 to open position. However, the normally closed shunt switch 89 will remain closed to maintain the first gating circuit 83 closed so long as no second voice signal is received by the microphone 66 to energize the second relay coil 90.

After the telephone conversation has ended, the invalid may open the telephone circuit by emitting a second, and in this case a terminal, voice signal, such as another whistle, which will be received by the control microphone 66, transmitted to energize the second SCR electronic gating switch 86, thereby closing the second gating circuit 84 and energizing second relay coil 90. If, as assumed, the terminal or second voice signal is emitted more that 5 seconds after the first voice signal then the shunt relay switch 89 will automatically open the first gating circuit 83. Simultaneously, however, the first relay coil 87 is deenergized to reset the selector switch 94 back to its contact with the bias lead 95, and to open the heater switch 97, button solenoid switch 107 and dialing relay switch 106. When the switch 101 opens, the button solenoid is immediately deenergized to depress the button lever 44 down against the button switches 17, thereby opening the telephone circuit. Opening of the switch 101 also opens the power supply circuit 103 to loudspeaker amplifier 64. After switch 97 opens, the heaters 99 and 100 begin to cool off to restore the time switches 92 and 88 to their original inoperative positions disclosed in the circuit diagram of FIG. 6. Even though the dialing switch 107 is closed, by the energization of second relay coil 90, the dialing switch 106 is simultaneously opened so that the dialing circuit 105 remains open.

The cooling-off periods for the heater elements 99 and 100, of course, depend upon the type of time-delay equipment employed and will vary from one device to another. However, the control circuit 81 of FIG. 6 will not be operative for the next calling or receiving operation until both heaters 99 and 100 have cooled and the switches 92 and 88 have been restored to their original positions.

In the event that the invalid desires to place a call, he again emits an initial voice signal such as a whistle, which will energize the first gate circuit 83, arm the second gate circuit 84, close the heater circuit 98, close the button solenoid circuit 102, and close the dial switch 106, as previously described. After the approximate 2 -second delay of the initial period required to arm the second gate circuit 84, then the invalid emits a second voice signal which must me given after the 2 -second initial period, but in less than 5 seconds. In other words, the second voice signal must be emitted after the timer switch 92 is closed, but before the timer switch 88 opens, a time lapse which will be referred to as the dialing period.

The second voice signal is transmitted from the control microphone 66 to energize the SCR 86, and thereby energize or close the second gating circuit 84, to energize the second relay coil 90. Energization of the second relay coil 90 will immediately open the shunt switch 89, which will have no effect on the first gating circuit 83 since the timer switch 88 is still closed during the dialing period. The energized second relay coil 90 also closes dialing relay switch 107. Since dialing relay switch 106 is already closed, dialing circuit 105 is energized to simultaneously energize the dial motor 33 and dial solenoid 40 which simultaneously gives the dialing disc 36 both rotary and translatory motion into driving engagement with the dial 12. As the dialing disc 36 rotates the bar magnet 112 away from the reed switch 111, the reed switch 111 opens to deenergize the relay coil 110, thereby opening the relay switch 91 to deenergize the second gate circuit 84 and closing the dialing relay switch 108 to lock in the dialing circuit 105.

After the dialing disc 36 has made substantially a complete revolution, the dial 12 has registered with the operator or "0" of the telephone dial, and the bar magnet 112 has returned to a position proximate to and adapted to close the magnetic reed switch 111, thereby reenergizing the third relay coil 110. Reenergization of the relay coil 110 recloses switch 91 to reset the second gate circuit. Since the second relay coil is immediately deenergized by the opening or the switch 91 during the initiation of the dialing operation, shunt switch 89 is returned to its original closed position before the timer switch 88 opens, thereby maintaining energization of the first gate circuit 83. The deenergization of the relay coil 90 also reopens the switch 107, so that when the third relay coil 110 is reenergized to open the dialing relay switch 108, the dialing circuit 105 is reopened. Consequently, the dial motor 33 and dial solenoid 40 are deenergized to stop the rotation of the dialing disc 36 to permit the dialing disc 36 to return to its inoperative position disengaging the dial 12, permitting the dial 12 to return to its initial position.

The invalid gives his calling number to the operator and the call is put through to the desired party. During this time, the heater switch 88 will open, but since the shunt switch first relay coil 87 remain energized to keep the telephone circuit closed.

After termination of the telephone conversation between the invalid and the called party, the invalid may then emit a third voice signal, such as a whistle, which is again transmitted from the control microphone 66 to energize the second SCR 86 to again energize the second gate circuit 84 and second relay coil 90. The shunt switch 89 is reopened to open the first gate circuit 83 and deenergize or "turn off" the control circuit 81, which opens the telephone circuit in the same manner as the telephone circuit was opened in the previous example of an incoming call.

It will be observed from the above description of the various elements, and particularly the time-delay elements, that there are three distinct voice-signal periods: the initial period, the dialing and the terminal period. The initial period had become arbitrarily selected as 2 seconds, while the dialing period has been arbitrarily selected as 3 seconds between the initial period ad the terminal period—the terminal period commencing 5seconds after the initial signal. It will also be observed that the call cannot be terminated, that is, the telephone circuit cannot be opened after it is closed, either during the initial 2 -second period of the subsequent or intermediate dialing period. The call can be terminated only during the termination period, 5 seconds or more after the initial voice signal is emitted.

Although the crystal microphone 66 is rather sensitive, nevertheless it should have a threshold value sufficient to reject incidental noise and other sound within or outside the invalid's room, and be able to respond only to the distinct voice signal, such as the whistle, of sufficient amplitude or volume emitted by the invalid.

After the heater elements 99 and 100 have cooled sufficiently, the elements of the control circuit 81 are automatically reset for the next operation, either an incoming call or an outgoing call.

What is claimed is:

1. An actuating apparatus for a telephone having a receiver contact switch contact switch element for energizing the transmitting and receiving circuits of the telephone when closed, comprising:

a. an electrical control circuit operatively connected to the receiver contact switch element, b. a control microphone operatively connected to said control circuit, said control circuit adapted to be energized by an initial electrical signal from said microphone corresponding to a voice signal, to close said switch elements, and subsequently by a terminal electrical signal from said microphone corresponding to another voice signal to open said switch element.

2. The invention according to claim 1 further comprising a time-delay means in said control circuit whereby said terminal signal is effective to open said switch element only after a predetermined initial period.

3. The invention according to claim 2 in which said telephone has a dialing mechanism, electrical means connected to said control circuit for actuating said dialing mechanism when said control circuit is energized by an electrical signal from said microphone corresponding to a voice signal emitted after said initial period and prior to said terminal signal.

4. The invention according to claim 3 further comprising a second time-delay means in said control circuit whereby an electrical signal is effective to actuate said dialing mechanism only during a dialing period after said initial period, and said terminal signal is effective to open said switch element only during a terminal period after said dialing period.

5. The invention according to claim 2 in which said control circuit comprises in parallel a first gate circuit including a first relay coil and a second gate circuit including a second relay coil, selector relay switch means connecting said microphone selectively with each of said gate circuits to energize the connected gate circuit when an electrical signal is transmitted from said microphone said selector switch means connecting said microphone to said first gate circuit when said first relay coil is deenergized, and connecting said microphone to said second gate circuit when said first relay coil is energized a second relay switch normally closing said first gate circuit, but adapted to open said first gate circuit upon energization of said second relay coil, said time-delay means being adapted to open said second gate circuit during said initial period and open said second gate circuit during said initial period.

6. The invention according to claim 5 in which said telephone has a dialing mechanism, electrical means connected to said control circuit for actuating said dialing mechanism dialing relay switch means adapted to energize said electrical dialing means when said second relay coil is energized, and for deenergizing said electrical dialing means after a predetermined dialing period.

7. The invention according to claim 6 further comprising second time-delay means adapted to open said first gate circuit after said dialing period terminates.

8. The invention according to claim 1 in which said telephone includes a cradle for supporting a handset, and said receiver contact switch element comprises buttons biased upwardly in said cradle normally to close the transmitting and receiving circuits of said telephone, said apparatus further comprising a chassis for receiving the base of the telephone and a support for receiving the handset removed from the cradle, a lever pivotally mounted in said cradle to extend across one of said buttons, said electrical control circuit comprising a solenoid mounted in said chassis and means for linking the armature of said solenoid to said lever so that when said solenoid is deenergized, said lever depresses said button, and when said solenoid is energized, said lever releases said button.

9. The invention according to claim 8 further comprising means for normally biasing said lever to a raised position releasing said button, said link means comprising a linear member connected to said armature in such a manner that when said solenoid is deenergized, said linear member is pulled downward to cause said lever to depress said button.

10 The invention according to claim 1 further comprising a chassis, means on said chassis for receiving the base of said telephone, and support mean s on said chassis for receiving the handset of said chassis separately from the base, said support means comprising a receiver -receptacle for electrically and mechanically receiving the receiver portion of the handset, and a transmitter receptacle for electrically and mechanically receiving the speaker of said handset, amplifier circuits in said chassis for said transmitter and said receiver, a loudspeaker, an electrical conduit connecting said loudspeaker to said amplifier circuit so that said loudspeaker may be positioned remote from said chassis, an extensible boom and means for mounting said boom adjacent a bed, a microphone housing on said boom, said control microphone and a speaker microphone being mounted in said microphone housing, electrical conduits for connection said speaker microphone and said control microphone to said control circuit in said chassis.

11. The invention according to claim 6 in which said switch means for said dialing mechanism comprises in series a first dial relay switch adapted to be closed by said first relay coil and a second dial relay switch adapted to be closed by the energization of said second relay coil, a third relay coil in said control circuit, said dialing mechanism comprising a dialing disc adapted to rotatably engage the dial of said telephone, and a limit switch associated with said dialing disc to normally be closed in its initial and final dialing positions, and to be opened during the rotation of said dialing between said initial and final positions, said limit switch being adapted to energize said third relay coil when closed, a third dialing relay switch connected in parallel to said first and second dialing relay switches to that said third dialing relay switch is closed to energize said dialing mechanism while said limit switch is open.

12. The invention according to claim 11 further comprising a fourth relay switch normally closing said second gate circuit and controlled by said third relay coil, to open said second gate circuit normally when said limit switch is open.

13. The invention according to claim 5 further comprising a first electronic gating device is said first gate circuit adapted to be turned on by a signal form said control microphone through said selector switch when said selector switch is connected to said first gate circuit, and second electronic gating device in said second gate circuit ad adapted to be turned on by a signal from said microphone through said selector switch when said selector switch is connected to said gate circuit, each of said first and second gating devices being adapted to be turned off by opening said corresponding first and second gate circuits.